Aug. 6, 1968

V. L. BARR ET AL 3,395,951

SELF-ALIGNING BUSHING

Filed Jan. 7, 1966

INVENTORS
VICTOR L. BARR &
HENRY K. SCHMIDT
BY

PAUL & PAUL

ATTORNEYS

Aug. 6, 1968    V. L. BARR ET AL    3,395,951
SELF-ALIGNING BUSHING
Filed Jan. 7, 1966    3 Sheets-Sheet 3

$\phi$ = CONTACT ANGLE
T = THRUST LOAD
CS = CONTACT STRESS OR LOAD
WF = WEDGING FORCE

INVENTORS
VICTOR L. BARR &
HENRY K. SCHMIDT
BY
PAUL & PAUL
ATTORNEYS 3,395,951
SELF-ALIGNING BUSHING
Victor L. Barr, Jenkintown, and Henry K. Schmidt, Levittown, Pa., assignors to Roller Bearing Company of America, West Trenton, N.J., a corporation of New Jersey
Filed Jan. 7, 1966, Ser. No. 519,352
9 Claims. (Cl. 308—72)

ABSTRACT OF THE DISCLOSURE

A self-aligning load-bearing bushing having high unidirectional thrust capacity relative to its radial capacity is disclosed. The bushing comprises a pair of hardened steel annular races sized for interference-free interfitting assembly, and readily separable after assembly. The outer race has a cylindrical outer surface and a spherical concave interior surface. The curvature of the spherical concave interior surface is described about a center point which lies on the longitudinal center axis of the bushing and the entire interior surface of the outer race lies to one side of the imaginary plane which passes through the center point of curvature perpendicular to the longitudinal center axis of the bushing. The inner race has a cylindrical interior surface and a converging spherical exterior surface sized and curved to interfit with the interior surface of the outer race.

---

This invention relates to load-supporting devices, particularly self-aligning bearings or bushings and the like.

As is well known to those familiar with the art, self-aligning bearings or bushings are used to advantage where there is misalignment with high static loads, and/or where there is intermitent oscillatory movement under load.

The use of self-aligning bushings or bearings has the advantage of reducing the cost of constructing and assembling the equipment or apparatus by avoiding the necessity of accurately aligning load bearing parts which are related to each other. To provide such alignment in the absence of self-aligned bearings is an expensive matter, even on smaller equipment. On heavy large equipment, the cost becomes very substantial indeed. The employment of self-aligning bearings allows the designer to reduce substantially the costs of machining, fitting and assembly.

In addition to reducing the cost, the use of self-aligning bearings has the advantage of increasing the dependability of operation of the equipment by assuring freedom of motion even after stress and distortion has caused movement or displacement of the housings in which the bearings are supported.

Heretofore, self-aligning bearings have been primarily radial bearings for heavy radial loads, with substantially lighter thrust capacities. For applications requiring high thrust and lighter radial capacities, the self-aligning bearing of the prior art has not been satisfactory.

A principal reason for the unsatisfactory action of the prior-art self-aligning bushing under heavy thrust is that the prior art bearing has a small contact angle with the result that the friction between the ball and the socket, or between the inner and outer races, is extremely high. As a consequence, the bearing tends to lock up or freeze under thrust load. This disadvantage is avoided by the new bearing which is characterized by having a steep contact angle, later fully discussed.

Accordingly, a broad object of the present invention is to provide a self-aligning bearing or bushing having high thrust capacity and at least moderate radial capacity.

A more specific object is to provide a self-aligning bushing having a high thrust capacity exceeding its radial capacity by at least 20%. This relationship is in contrast to the self-aligning bearings of the prior art in which the thrust capacity is of the order of only 40% of the radial capacity.

The important improvements in thrust capacity and in other characteristics of the new bushing results from its favorable geometrical configuration, its configuration being such that a mechanical advantage is applied to forces which resist the thrust load. Frictional forces tending to lock the bearing are minimized, while at the same time a maximum force component is provided in opposition to the applied thrust.

A conventional self-aligning bearing of the prior art includes two annular races, an outer race and an inner race. The interior surface of the outer race has an arcuate contour, and the outer surface of the inner race has a corresponding or mating arcuate contour. More specifically, these arcuate surfaces are spherical segments described about a center point which lies not only on the longitudinal center axis of the bearings but also in an imaginary plane perpendicular to the longitudinal axis of the bearing. This perpendicular plane intersects the arcuate or spherically curved surfaces of the inner and outer races of the prior-art bushing at the midpoints of their spherical curvatures. Thus, the inner race of the prior-art self-aligning bearing has an outside diametral dimension at the center point of its curvature which is greater than the interior diametral dimension of the outer race at the ends of its curvature. The insertion of the inner race into the outer race therefore presents a problem.

Various methods have been proposed and used by the prior art for inserting the inner race into the outer race. None is completely satisfactory. In one method the outer race is fractured at two places. In another method, the outer race is fractured at but one place. In other methods the outer race is not fractured. In one such method, one or more mounting slots are cut in the side wall of the outer race. In another, the inner race and/or the outer race is squeezed out of round. In another, the outer race is cold formed or swaged on the inner race. These are but some of the methods employed. Each has its disadvantages.

In the method referred to above wherein the outer race is fractured at two places, one or more circumferential exterior grooves are ordinarily provided and snap rings or bands inserted therein to hold the fractured outer race together after the inner race has been inserted. Such construction, when subjected to thrust, develops high stress in the regions of the fractures. While the housing in which the race is mounted will help to hold the fractured outer race together, the fractured race halves, under force of thrust, tend to separate and this tends to cause galling between the inner and outer races.

In the method where the outer race is fractured at only a single place, the outer race spreads apart at the point of fracture as the inner race is forced axially into its bore. While this deformation of the outer race is intended to be within the elastic limit of the material, losses are experienced in manufacture when the elastic limit is passed. Moreover, under thrust loads, the outer race tends to expand radially due to the wedging action, discussed more fully hereinafter. This expansion introduces circumferential or hoop stresses into the housing, and this makes it necessary, where heavy thrust loads are expected, to employ housings of massive size or of high strength material.

In the case where the outer race is provided wth a mounting slot to permit the inner race to be slipped edgewise thereinto and then rotated to its normal position, the outer race is substantially weakened in the region of the slot for both radial and thrust loads in the direction of the slot.

In the case where the outer race is cold formed or swaged on the inner race, the outer race material is necessarily relatively soft and deformable, as contrasted with the through hardened material used in the bushing of the present invention. As a consequence, the prior-art housing is subjected to heavier hoop stresses, similar to that discussed briefly above with respect to the fractured outer race, and housings of more massive size or of higher strength material must be employed.

Another object of the present invention is to provide a self-aligning bushing of high thrust capacity, having also at least moderate radial capacity, which may be easily assembled or disassembled without fracture or distortion of either the inner or outer races, and which will allow for adjustment of axial clearance.

Another object is to provide a separable self-aligning busihng of high thrust and at least moderate radial capacity which may be easily assembled and which will allow a press fit of the outer race into its supporting housing and a separate press fit of the inner race on to the shaft to be supported.

The above provides the important advantage of allowing each race to be separately stocked and separately press fitted to its machine sub-assembly at different work areas, or even at separate plants, without complicating the subsequent end-product assembly. The use of interference fits on both races eliminates the tendency of the inner race to move on the shaft, thereby taking all relative motion between the races on their spherical surfaces. This is in contrast to the non-separable prior art bearing where it is necessary to have the inner race loosely fitted to the shaft. Due to the loose fit, the inner race usually rotates on the shaft, and in many instances this necessitates hardening of the shaft.

It is a further object to provide a self-aligning thrust bearing having, in addition to the aforesaid features, broad end-face surfaces so that the thrust load on the shoulders of the housing and on the shoulders of the shaft may be adequately distributed, thereby preventing brinelling of housing and/or shaft.

In some applications, the self-aligning bushing of the invention may be under large amplitude motion and/or frequent motion, and in such cases re-lubrication may be required. Accordingly, it is a further object of the present invention to provide a self-aligning bushing which may be easily and adequately lubricated.

The foregoing objects are achieved, in accordance with a preferred embodiment of the present invention, by providing a bushing consisting of two members, a female member and a male member, so shaped as to be readily and easily put together, and readily and easily separated, without fracture or distortion of either of the members. The socket of the femal member is cup-shaped, with a through axial bore. In other words, the interior surface of the female member has a hemispherical zone shape with the small diameter at the rear of the member and a maximum diameter at the forward edge. The maximum diameter of the bore is just slightly larger than the maximum outside diameter of the male member, which has a spherical convex exterior surface which converges in the same direction as the female member and is adapted to mate with the spherical interior surface of the female member. Thus, the male member may be readily and easily inserted into the female member without interference. The high thrust capacity of the bushing is obtained by a steep contact angle and by the absence of fracture. The advantage of the step contact angle is fully explained below. Lubrication is provided by means which, in the presently preferred embodiment, include crossed grooves of loop configuration in the spherical inner surface of the female member and so disposed as to allow lubrication to be applied either radially or axially.

The invention will be clearly understood from a consideration of the following description taken together with the drawings in which.

Figure 1:
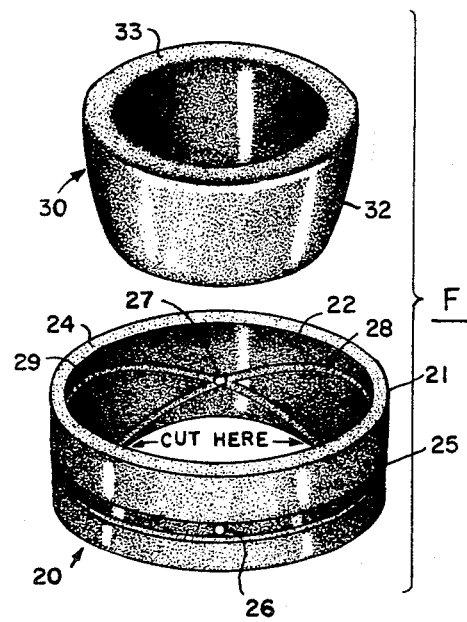
FIG. 1 is a perspective exploded illustration of the two races of the new self-aligning thrust bushing, as viewed looking down from the front.
Figure 2:
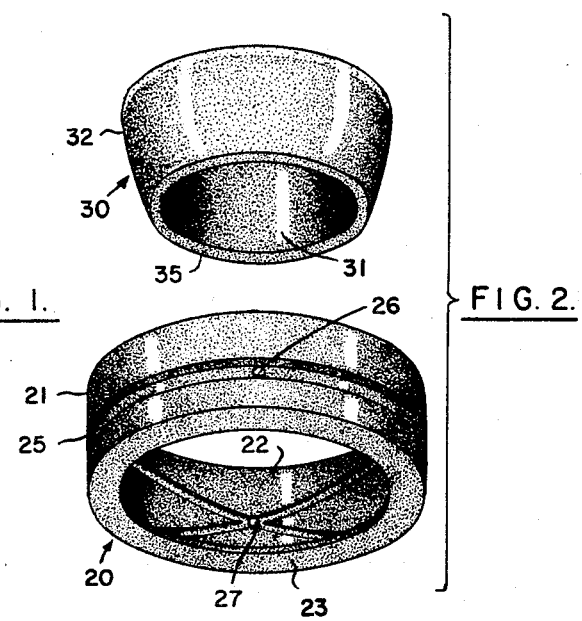
FIG. 2 is a perspective exploded illustration generally similar to FIG. 1 but looking from the rear.

Referring now to the drawings, the thrust bushing is shown in FIGS. 1 and 2 to consist of two annular members, a female member or outer race 20 and a male member or inner race 30. The races 20 and 30 are each made of suitable material which may preferably but not necessarily be electric furnace steel SAE 52100 through hardened to prevent brinelling and loss of fit. The races may also be coated with a dry film lubricant.

Figure 3:
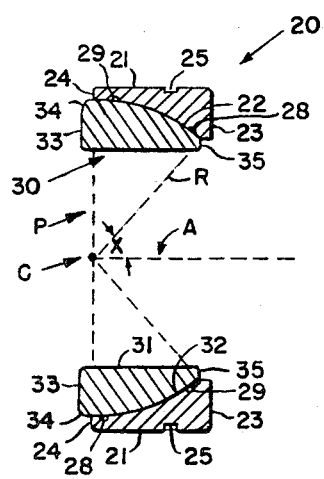
FIG. 3 is a diagrammatic cross sectional view of the new thrust bushing.
Figure 4:
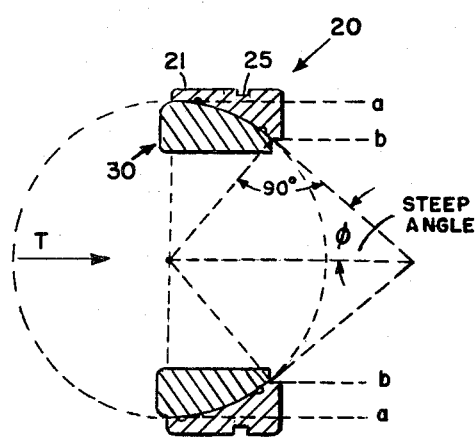
FIG. 4 is a diagrammatic illustration which will be helpful in explaining the features of the new bushing.

The outer race 20 has a cylindrical external surface 21 and a hemispherical zone shaped interior surface 22, as seen most clearly in FIGS. 3 and 4. Cylindrical surface 21 is shown to have an annular oil groove 25 therein, with holes 26 and 27 extending through to communicate with the interior surface 22. The interior surface 22 has a spherical concave curvature which, as shown in FIG. 3, has a center point C which lies on the longitudinal center axis A of the bushing. The spherical concave curvature preferably starts at (or near) the front end of the bushing but not in front of, at least not substantially in front of, a plane P which passes through the center point of curvature C and is perpendicular to the longitudinal center axis A of the bushing. The spherical concave curvature of surface 22 extends rearwardly to an imaginary conical surface R generated by rotation of a line originating at the center point C and extending rearwardly at an angle X relative to the center axis A of the bushing. The smaller the angle X, the steeper the contact angle $\phi$, later referred to. The smallness of angle X is limited by the diameter of the shaft end which is to be supported in, and which may project from the rear of, the bushing.

The inner race 30 has a cylindrical interior surface 31 adapted to mate with the cylindrical shaft end to be supported. The exterior surface 32 of inner race 30 is spherical convex and converges toward the rear, the large diameter being at the front. The surface 32 is sized and contoured to mate with surface 22.

The concave surface 22 of race 20 and the convex surface 32 of race 30 are preferably precision ground to provide a high degree of contact between the working surfaces 22 and 32.

As a result of the hemispherical zone shape of the convex surface 32, the inner race 30 has an annular forward face 33 which is broad or wide radially, and thus capable of distributing the expected thrust load on the shoulder of the shaft. The annular rear surface 35 is more narrow, but is of sufficient width to allow the race 30 to be press fitted on to the end of the shaft which it is to support.

As a result of the hemispherical zone shape of the concave surface 22, the outer race has an annular rear surface 23 which is wide radially. The annular front face 24 is relatively narrow radially. The wide rear surface 23 provides, as is desirable, a broad surface for distribution of the thrust against the housing or other member which supports the outer race.

The face 24 of the outer race may, in some instances, be located slightly forward of the plane P, but if the face is so located, the extension of the surface 22 which projects beyond the plane P should either be substantially parallel with, or slant away from, the axis A, in order to provide for ready assembly and separation of inner race 30 into or out of outer race 20. In other words, the diameter of the opening of the bore at the forward end of the outer race should not be substantially less than the diameter of the surface 22 at the plane P.

After the inner race 30 has been press fitted on to the shaft, and the outer race 20 has been press fitted into its housing, the shaft and its inner race 30 may be inserted readily into the housing-mounted outer race 20. When so inserted, and aligned, the center axes of the two races are collinear. When the inner race 30 is fully seated, the forward portion thereof, or "stand-out," will project forwardly from the outer race 20, as indicated in FIGS. 3 and 4. To assure that the inner and outer races will not bind or lock when the two races are out of co-alignment to a maximum degree, the stand-out portion of the exterior surface 32 of the inner race 30, i.e. the portion which extends forwardly of the plane P, may be beveled or filleted, as at 34, or may merely be spherically converging.

The new bushing is specially designed to provide high thrust capacity in one direction, i.e., in the direction indicated by the arrow T in FIG. 4, together with at least moderate radial capacity. The high thrust capacity is accomplished by providing a steep-angled thrust contact area. This is a steeply tapered annular contact area of spherical curvature on each race, represented in the cross-sectional diagram of FIG. 4 as lying between the dotted lines $a$–$b$. The contact angle in pure thrust in this region is indicated in FIG. 4 by the angle $\phi$, which may be defined as the angle formed by the tangential projection of the contacting surfaces and the center axis. The angle $\phi$ in FIG. 4 will be seen to be substantially steeper than the contact angle of the typical prior art self-aligning bearing, a diagrammatic cross-section of which is illustrated in FIG. 6.

Figure 6:
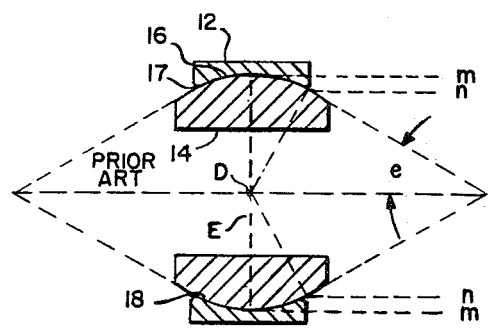
FIG. 6 is a diagrammatic cross section view of a prior art self-aligning bearing.

In FIG. 6, the reference numeral 12 identifies the outer race, and the reference numeral 14 the inner race. The concave interior surface 16 of the outer race, and the convex exterior surface 18 of the inner race are arcuate segments of spherical surfaces described about the center point D lying on the longitudinal center axis of the bearing. The plane E passing through the center point D passes through the mid-points of the spherical segments which define the surfaces 16 and 18 of the outer and inner races.

To facilitate the forced entrance of inner race 14 into the outer race 12 during assembly of the prior-art single-fracture bearing, the edges of the interior wall 16 of the outer race are usually rounded or filleted, as at 17. The resultant annular area of contact is indicated in FIG. 6 as lying between the dotted lines $m$ and $n$; and the contact angle is the angle $e$. Referring again to FIG. 4, it will be seen that the steep angle of contact, angle $\phi$, is substantially more steep than the contact angle $e$ indicated in FIG. 6. Thus, the thrust capacity of the new bushing of the present invention is substantially greater than that of the bushing of the prior art represented in FIG. 6.

In addition, it will be seen that in structures wherein the shaft does not extend completely through the bushing, the new bushing will allow a far greater angle of misalignment than is possible with prior art bearings of comparable size. This results from the fact that the new bushing will allow a greater stand-out of the inner race from the outer race for a comparable size of inner-race thrust face, or will provide a larger thrust face on the inner race than is required for the shaft shoulder.

The new self-aligning steep-angle thrust bushing has many uses and applications, as for example, in king pin assemblies of motor vehicles, in hinges of articulated tractors, in the fifth wheel of earth-moving equipment, and in many other applications. The steep angle design permits maximum thrust loading for those applications requiring high thrust and lighter radial capacities. The fact that the races are readily separable and readily assembled permits mounting both races individually, with respective interference fits.

The new bushing also meets a basic principle of good engineering design by allowing the use of larger radii or fillets in shaft or housing shoulders than can be used with bearings of the prior art. This is due to the larger thrust end faces of both races. The large thrust end faces of both races also results in minimum bearing pressures against the housing or against the shaft shoulders.

A further advantage of the new bushing resides in the absence of interference as the inner race is mated with the outer race. This permits the internal clearance or preload on the bearing to be adjusted, not only at the time of assembly, but also in subsequent service to compensate for wear.

The ground spherical surfaces assure near 100% conformity between the contacting surfaces, thereby reducing the contacting stress. The through hardened 52100 steel prevents the hammering out or brinelling of the bearing surfaces, thereby maintaining proper axial and diametral clearance. Both races are completely coated with a dry film lubricant.

The dry film lubricant may be sufficient for occasional small angular motions under rated loads. However, where more frequent motion, or large amplitude motion, is expected or experienced, relubrication is required with grease of sufficient film strength to maintain separation of the races under the imposed load. For this purpose, the exterior surface of the outer race 20 may be provided with a circumferential lubrication groove 25 and with at least one radial hole. Two such holes, 26 and 27, oppositely disposed in the groove 25 are shown in the illustrated embodiment. These extend radially through the outer race 20.

In accordance with the present invention, the spherical concave interior surface 22 of outer race 20 is provided with one or more lubrication grooves. Two such grooves, 28 and 29, are shown in the illustrated embodiment. The lubrication groove or grooves in the spherical concave interior surface 22 preferably follow a circular, or a spiral, or a serpentine path. In the illustrated embodiment each of the grooves 28 and 29 follows a circular path. Each circular path is inclined with respect to the axis of the bearing, and each intersects the other at two points, preferably at the locations of the radial ports 26 and 27. Thus, the radial application of lubrication to the circumferential groove 25 affords lubrication to the grooves 28 and 29 and thus to the spherical bearing surfaces 22 and 32 of the inner and outer races.

The circular, spiral, or serpentine lubrication groove or grooves in the spherical concave interior surface 22 of the outer race 20 preferably follow a path or paths which take the groove close to, but not all the way to, the rear edge of the race 20. Then in those applications where it is desired to apply the lubricant axially rather than radially, the narrow bit of material which lies between the rear edge of the race and the lubrication groove at the point where the groove approaches most closely to the rear edge, may be cut or milled away, as indicated in FIG. 1, thereby permitting application of lubricant in the axial direction of the shaft. As an alternative, to provide for axial lubrication a passageway may be provided from any other point on the lubrication groove, such as on groove 28 and/or 29, to the rear end face 23 of outer race 20, and such passageway may either be a surface groove or a drilled tube.

Figure 5:
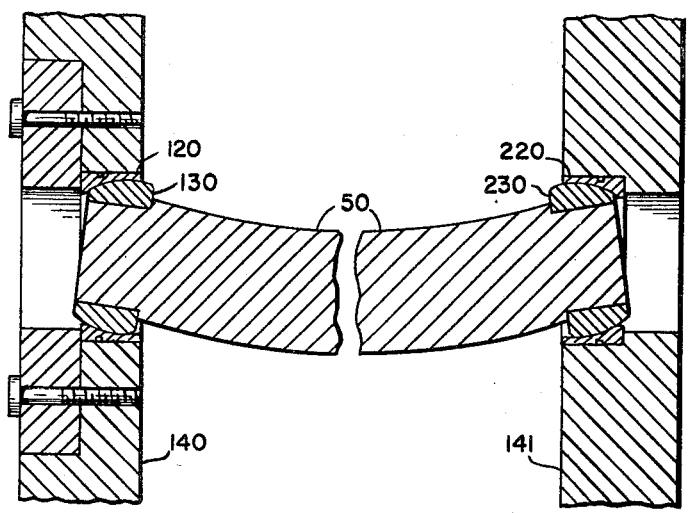
FIG. 5 illustrates one of many advantages of the new bushing.

FIG. 5 depicts graphically one of many useful applications of the new thrust bushing. In FIG. 5, a shaft 50, which is assumed subject to occasional or intermittent rotational movement, as distinguished from high speed rotation, is shown supported between the frames 140 and 141 by the thrust bushings of the present invention. Outer race 220 of one bushing is fixed fitted in frame 141, while outer race 120 of the other bushing is adjustably fitted in frame 140. This provides adjustment of the axial clearance between the inner and outer races at each end, as previously described. It is assumed that shaft 50 is subject to wide variations in temperature, including high heat. Use of the self-aligning bushing of the present invention allows the shaft 50 to expand in its lengthwise direction and bend, without binding at the bushings. The graphical illustration in FIG. 5 is exaggerated to bring out the point.

To summarize briefly, it will be seen that the present invention provides a self-aligning bushing comprising a female member 20 and a male member 30, that the male member 30 has a cylindrical bore and a hemispherical-zone shaped convex exterior surface 32, that the female member 20 has a hemispherical-zone shaped concave interior surface 32, and that the large diameters of the spherical surfaces are at the corresponding one end of each member. The male member 30 is thus readily insertable within, and separable from the female member 20 with no interference encountered. This allows adjustment of internal clearance to be made at any time, and enables the inner and outer races to be individually mounted before being brought together. The fact that neither race need be fractured to achieve assembly, and that both races may be made of through hardened steel, has the effect of removing hoop stress from the housing and placing it in the bearing. The steep contact angle of the working or bearing surfaces provides the assembled bushing with high thrust capacity, and very substantially reduces the wedging action, thereby eliminating any tendency for the races to lock up and freeze. This is discussed later in connection with FIG. 7. When interfitted, and aligned, the center axes of the male and female are collinear, but the members are free to assume non-collinear attitudes relative to each other, the allowable misalignment being substantially greater than allowed by the prior-art bushing. It will also be seen that one or more lubrication grooves are provided in the spherical interior surface 22 of the female member 20 to provide lubrication of the working surfaces, and that provision is made for either radial or axial lubrication, as the situation demands.

Figure 7:
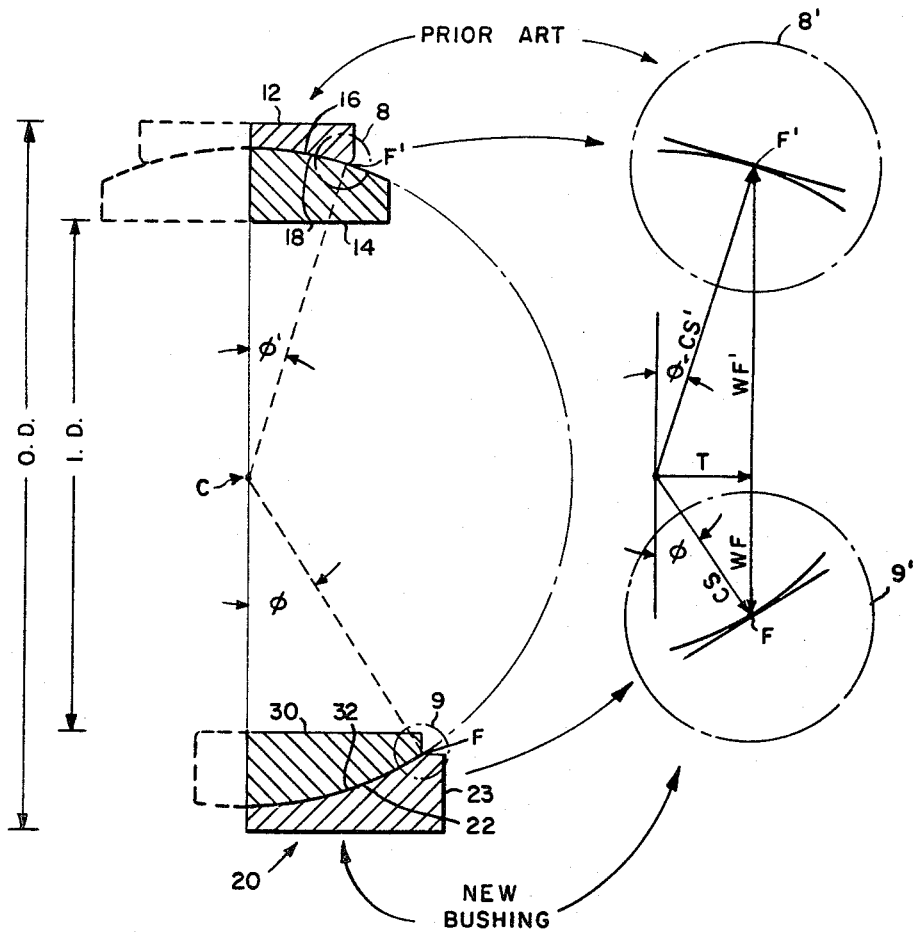
FIG. 7 is a diagrammatic illustration which will be helpful in explaining and understanding the structural differences and advantages of the new bushing as contrasted with that of the prior art.

FIG. 7 is a composite diagram which will be helpful in comparing the prior art bushing with the bushing of the present invention with particular attention directed to the relative wedging actions of the two bushings.

In FIG. 7, point C is the center point of the curvature of the spherical working surfaces 16 and 18 of the outer race 12 and inner race 14 of the prior art bushing. The point C is also the center point of curvature of the hemispherical-zone-shaped surfaces 22 and 32 of the outer race 20 and inner race 30 of the new bushing of the present invention. The radii of the spherical working surfaces 16 and 18, and of the hemispherical working surfaces 22 and 32 of the new bushing, are equal. The outside diameters of the two bushings are equal, as are the inside diameters. Angle $\phi'$ represents the contact angle of the prior art bushing, and angle $\phi$ represents the contact angle of the new bushing. It will be seen that the angle $\phi$ is substantially greater than the angle $\phi'$.

In order to compare the wedging forces which result from thrust applied, from left to right as viewed in FIG. 7, we need concern ourselves only with that part of the prior art bushing and with that part of the new bushing, which lies to the right of the plane which passes through the center point C perpendicular to the longitudinal axis of the bushing, and, accordingly, those parts of the prior-art and new bushing which lie to the left of this plane are shown in dotted line.

When a thrust load is applied, a wedging force is developed at point F' on the contacting surfaces 16, 18 of the prior art bushing, and at point F on the contacting surfaces 22, 32 of the new bushing. Such wedging forces are also developed, of course, at all other points having the same relationships to the center point C as the points F' and F. The sum of such points defines, in each case, an annulus corresponding to the locus of each of the points F' and F.

In FIG. 7, an attempt is made to compare the wedging forces acting on the point F', and on the point F. The forces involved are indicated by the vectors T, CS, CS', WF and WF'. The vector T represents the direction and magnitude of a pure thrust load. The vector diagram as drawn assumes equal pure thrust loads T to be applied at the points F' and F. The vectors WF and WF' represent the wedging forces, respectively, at the points F and F'. The vectors CS and CS' represent the contact stresses or contact loads at the points F and F'. It will be seen that for an equal thrust load T, the wedging force WF' which is developed in the case of the prior-art bushing is substantially larger than the wedging force WF which is developed in the case of the new bushing. This result is due to the fact that the contact angle $\phi$ of the new bushing is substantially larger than the contact angle $\phi'$ of the prior art bushing. The substantial reduction in wedging force realized by the new bushing is an important achievement, since it substantially eliminates any tendency of the new bushing to lock up or freeze. Viewed another way, if equal contact loads be applied to the points F' and F at the contact angles $\phi'$ and $\phi$, respectively, the new bushing will develop a substantially greater reaction thrust in opposition to the pure thrust component of the applied force.

While the preferred embodiments of this invention have been described in some detail, it will be obvious to one skilled in the art that various modifications may be made without departing from the invention as hereinafter claimed.

What is claimed is:

1. A load-supporting bushing of high unidirectional thrust capacity relative to its radial capacity, said bushing consisting only of an annular male member and an annular female member, said male member having at least a hemi-spherical-zone-shaped convex exterior surface, said female member having a hemi-spherical-zone-shaped concave interior surface which converges from a maximum diameter at the front end to a minimum diameter at the rear end, said female member being sized to receive matingly said male member free of interference and providing a maximum steep contact angle at said rear end, said male and female members when interfitted having substantial surface means in engagement for transmitting thrust and radial loads as said male and female members assume collinear and non-collinear relative attitudes, and being readily separable.

2. A bushing as claimed in claim 1 characterized in that said interior surface of said female member is provided with two lubrication grooves each of which describe closed circular loops and intersect each other, each loop being inclined relative to the axis of said female member; further characterized by the provision of at least one lubrication port located at an intersection of said grooves and extending laterally through the wall of said female member; further characterized in that a circumferential lubrication groove is provided in the outer surface of said female member, and in that said lateral lubrication port terminates in said circumferential groove; and further characterized in that a portion of said lubrication groove in said interior surface of said female member is located close to the rear edge of said female member.

3. A bushing as claimed in claim 2 further characterized in that a lubrication passage is provide from said lubrication groove in said interior surface to the rear end face of said female member to provide communication to said interior surface lubrication groove in the axial direction of said bushing.

4. A load-bearing bushing having high unidirectional thrust capacity relative to its radial capacity, said bushing comprising only first and second members each having an annular load-bearing surface, one external convex and spherical-zone-shaped and the other internal concave and hemispherical-zone-shaped, each of said surfaces converging from a large diameter at one end of the member to a small diameter at the other, said member being sized for interference-free surface-to-surface interfitting, said members when interfitted and aligned having a common longitudinal axis, and their surfaces having a common center of curvature but adapted when interfitted to assume non-collinear attitudes relative to each other, said members when interfitted being freely separable by movement in opposing separating directions.

5. A self-aligning bushing of high unidirectional thrust capacity relative to its radial capacity, said bushing comprising only two readily separable members, one a generally annular outer race and the other a generally annular inner race, said outer race having a cylindrical outer surface and a converging interior surface having a spherical concave curvature described about a center point which lies on the longitudinal center axis of the bushing and characterized in that said spherical concave curvature lies on one side only of the imaginary plane which passes through said center point of curvature perpendicular to the longitudinal center axis of the bushing, said inner race having a cylindrical interior surface and a converging spherical convex exterior surface sized and curved to substantially interfit with said outer race interior surface, said spherical concave surface of said outer race extending rearwardly to an imaginary conical surface generated by rotation of a line originating at said center point and extending rearwardly at an acute angle relative to said longitudinal center axis, said acute angle being sufficiently small to eliminate substantially any tendency of the two races to lock and freeze due to wedging forces.

6. A bushing as claimed in claim 5 characterized in that when said inner and outer races are interfitted and aligned, the front portion of said inner race extends slightly forwardly beyond the face of said outer race.

7. A load-supporting bushing according to claim 1 characterized in that said male and female members are of hardened steel.

8. A load-bearing bushing according to claim 4 characterized in that said first and second members are of hardened steel.

9. A self-aligning bushing according to claim 5 characterized in that said outer and inner races are of hardened steel.

References Cited
UNITED STATES PATENTS

| | | | |
|---|---|---|---|
| 1,856,304 | 5/1932 | Whiteley | 308—240 |
| 2,500,592 | 3/1950 | Whiteley | 308—72 |
| 3,161,445 | 12/1964 | Haller | 308—72 |
| 2,842,945 | 7/1956 | Swanson | 308—135 XR |

MARTIN P. SCHWADRON, *Primary Examiner.*